(12) United States Patent
Zhang et al.

(10) Patent No.: US 12,336,513 B1
(45) Date of Patent: Jun. 24, 2025

(54) HUMMINGBIRD FEEDER

(71) Applicant: NETVUE TECHNOLOGIES CO., LTD., Shenzhen (CN)

(72) Inventors: Rui Zhang, Shenzhen (CN); Youle Hu, Shenzhen (CN); Qiang Feng, Shenzhen (CN); Anding Zhong, Shenzhen (CN)

(73) Assignee: NETVUE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/895,503

(22) Filed: Sep. 25, 2024

(30) Foreign Application Priority Data

Feb. 28, 2024 (CN) .......................... 202420374785.8

(51) Int. Cl.
*A01K 39/02* (2006.01)
(52) U.S. Cl.
CPC ................................ *A01K 39/0206* (2013.01)
(58) Field of Classification Search
CPC ................ A01K 39/0206; A01K 39/02; A01K 39/0213; A01K 39/04
See application file for complete search history.

(56) References Cited

U.S. PATENT DOCUMENTS

| | | | |
|---|---|---|---|
| 2006/0065202 A1* | 3/2006 | Fort, II | A01K 39/0206 119/72 |
| 2007/0272161 A1* | 11/2007 | Stone | A01K 39/0206 119/51.01 |
| 2007/0289540 A1* | 12/2007 | Stone | A01K 39/02 119/72 |
| 2008/0257273 A1* | 10/2008 | Carter | A01K 39/0206 119/72 |
| 2014/0109835 A1* | 4/2014 | Colvin | A01K 39/024 119/74 |
| 2014/0109836 A1* | 4/2014 | Gauker | A01K 39/0206 119/75 |
| 2018/0000053 A1* | 1/2018 | Stone | A01K 39/02 |
| 2019/0320621 A1* | 10/2019 | Lubic | A01K 39/0206 |
| 2022/0022428 A1* | 1/2022 | Cruz | A01K 39/012 |
| 2022/0132810 A1* | 5/2022 | Levite | F16B 2/22 119/74 |
| 2022/0295758 A1* | 9/2022 | Lubic | A01K 39/026 |

* cited by examiner

*Primary Examiner* — Trinh T Nguyen

(57) ABSTRACT

A hummingbird feeder includes a food storage cylinder and a feeding container, the feeding container includes a bottom shell and a cover body, the bottom shell is detachably connected with the food storage cylinder, and an annular flange is arranged on the bottom shell; the cover body is sealed and buckled on the annular flange and forms a feeding cavity; the cover body is provided with a feeding port and an inlet that are connected with the feeding cavity, and the inlet is connected with the food storage cylinder.

8 Claims, 4 Drawing Sheets

HUMMINGBIRD FEEDER

CROSS REFERENCE TO RELATED APPLICATION

This application claims priority benefit of Chinese patent Application No. 202420374785.8, filed on Feb. 28, 2024, and the entire contents of which are incorporated herein by reference.

TECHNICAL FIELD

The present invention relates to the technical field of bird feeder, in particular to a hummingbird feeder.

BACKGROUND

The hummingbird feeder is a device for providing nectar, sugar water, water or other bird food for hummingbirds, and mainly comprises a food storage cylinder and a feeding container, wherein the food storage cylinder is communicated with the feeding container. In the prior art, due to the fact that hummingbirds directly suck bird food in a feeding container, bacteria, microorganisms or other impurities can be introduced into the feeding container, and the bird food in the feeding container is easily polluted, and the feeding container needs to be cleaned or replaced regularly; however, the existing hummingbird feeder usually needs to be inverted or overturned, and then the feeding container is disassembled and replaced, and then is cleaned or replaced, so that it can be seen that the disassembly and assembly process is relatively troublesome, does not conform to ergonomics, and is inconvenient to clean.

SUMMARY

The present invention aims to provide a hummingbird feeder for solving the above problems.

The present invention realizes the above object through the following technical scheme: the feeding container comprises a bottom shell and a cover body, the bottom shell is detachably connected with the food storage cylinder, and an annular flange is arranged on the bottom shell;

the cover body is sealed and buckled on the annular flange and forms a feeding cavity; the cover body is provided with a feeding port and an inlet that are connected with the feeding cavity, and the inlet is connected with the food storage cylinder.

Further, the feeding container further comprises a connecting piece, one end of the connecting piece is in stop fit with the bottom shell and is provided with a gear, and the other end of the connecting piece passes through the bottom shell and is screwed with the food storage cylinder; The bottom of the bottom shell is rotatably connected with a knob, and the knob is provided with a gear ring meshed with the gear; and the gear can be driven by rotating the knob, so that the connecting piece is tightened or loosened relative to the food storage cylinder, thereby realizing quick disassembly and assembly.

Further, the bottom shell is convexly provided with a main shaft, the knob is provided with a rotating hole sleeved with the main shaft, the main shaft is connected with a limiting piece, and the limiting piece is in stop fit with the bottom surface of the knob; and the knob can be limited on the bottom shell, so that the knob does not fall off and does not affect normal rotation.

Further, a shaft sleeve is sleeved on the limiting piece, the shaft sleeve is pressed between the limiting piece and the main shaft, a rotation stop block is convexly arranged on the shaft sleeve, and a notch for clamping with the rotation stop block is arranged on the main shaft.

Further, a driven gear meshed with the gear ring is rotatably connected to the bottom of the bottom shell, and the driven gear and the connecting piece are evenly distributed along the circumferential direction of the knob, so that the stress can be uniform, and the disassembly and assembly are convenient and quick.

Further, the bottom shell is convexly provided with a rotating shaft, and the driven gear is sleeved on the rotating shaft, thereby facilitating the rotational connection of the driven gear.

Further, the gear ring is provided on an inner circumferential surface of the knob, and an anti-slip pattern is provided on an outer peripheral surface of the knob; and the reasonable layout enables the structure to be simpler and more compact, and facilitates rotation of the knob.

Further, an annular groove adapted to the annular flange is provided at the bottom of the cover body, so as to ensure that the cover body is firmly connected and sealed, and avoid leakage of the feeding cavity.

Further, the cover body is made of flexible material, which is convenient to disassemble, assemble and clean.

The present invention has the beneficial effects that: when the feeding container needs to be cleaned or replaced, the feeding container can be quickly disassembled from the bottom of the feeder only by operating the detachable connecting structure, and the steps of turning or inverting the feeding container are unnecessary, which is more in line with ergonomics; moreover, the cover body is buckled and matched with the bottom shell, so that the cover body and the bottom shell can be disassembled, and the inner wall of the feeding cavity can be easily cleaned, so that the cleaning is more convenient and comprehensive; in general, the present invention has the advantages of simple structure, quick disassembly and convenient cleaning, and the feeding container can be conveniently disassembled or replaced, and the feeding container can be completely cleaned, so that the feeding container is relatively clean.

Figure 1:
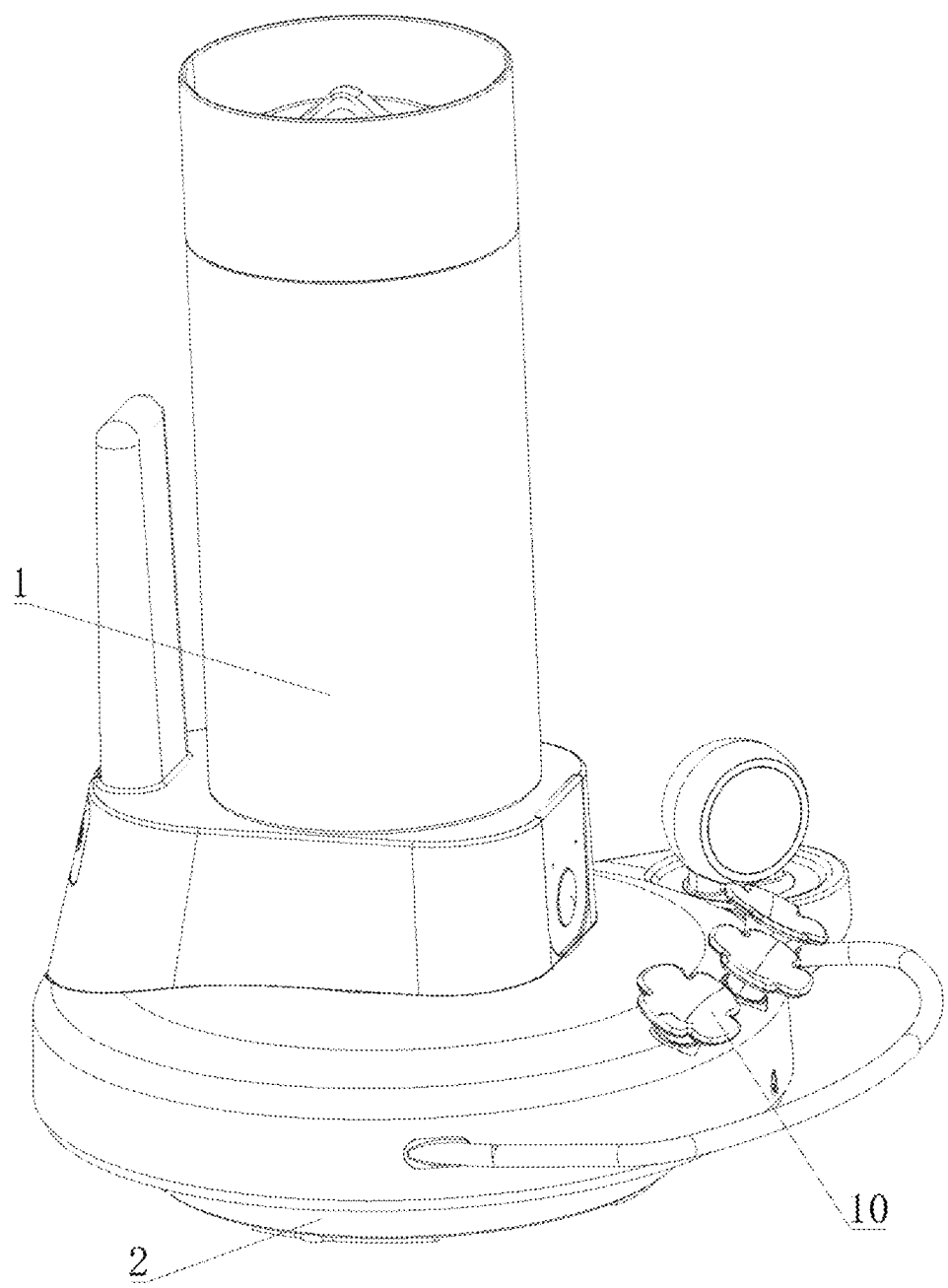
FIG. 1 is a schematic diagram of the overall structure of the present invention.

The reference numerals describe the following: 1—food storage cylinder; 2—bottom shell; 21—annular flange; 22—main shaft; 23—notch; 24—rotating shaft; 25—guide sleeve; 3—cover body; 31—feeding port; 32—inlet; 33—annular groove; 4—feeding cavity; 5—connecting piece; 51—gear; 6—knob; 61—gear ring; 62—rotating hole; 63—anti-slip pattern; 7—limiting piece; 8—shaft sleeve; 81—rotation stop block; 9—driven gear; 10—feeding nozzle.

EMBODIMENTS

For a fuller understanding of the nature and objects of the present invention, the accompanying drawings and embodiments are referred to give a detailed description. It should be noted that when an element is expressed as "fixed" to another element, it may be directly on the other element, or there may be one or more centered elements in between. When an element is expressed as "connected" to another element, it may be directly connected to the other element, or there may be one or more centered elements in between. The terms "up", "down", "left", "right", "inside", "outside" and similar expressions used herein are for illustrative purposes only.

Unless otherwise defined, all technical and scientific terms used herein have the same meanings as those skilled in the art of the present invention would normally understand. The terms used herein in the descriptions are intended to illustrate particular embodiments and do not limit the scope of the present invention. The term "and/or" used herein includes any and all combinations of one or more related listed items.

Figure 2:
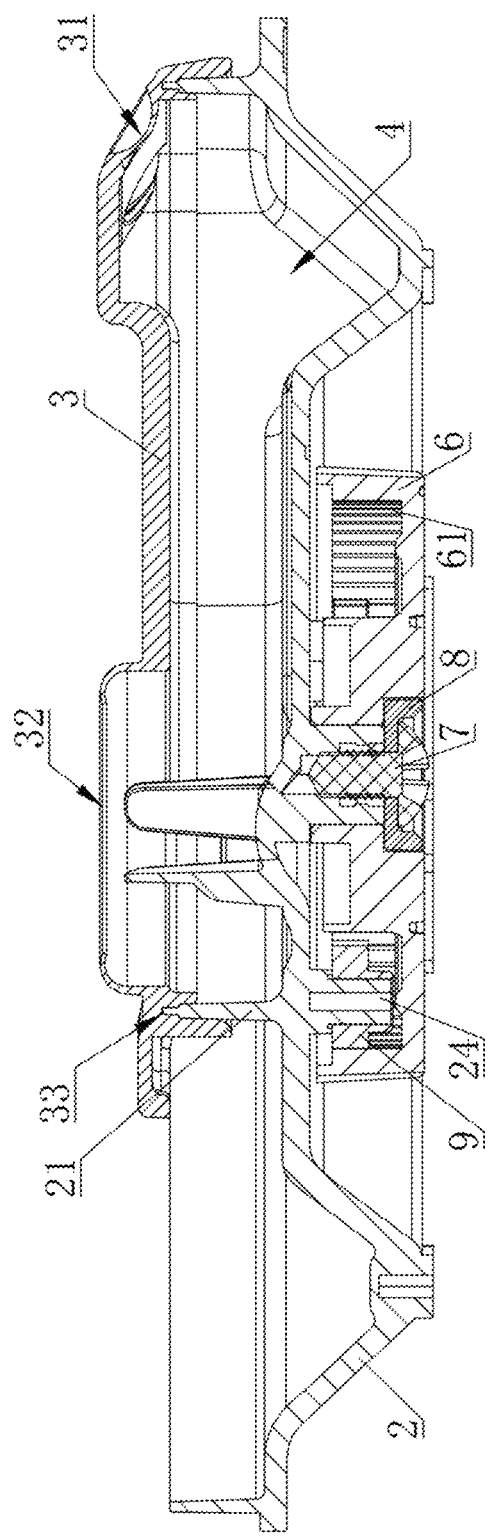
FIG. 2 is a schematic sectional view of the feeding container according to the present invention.
Figure 3:
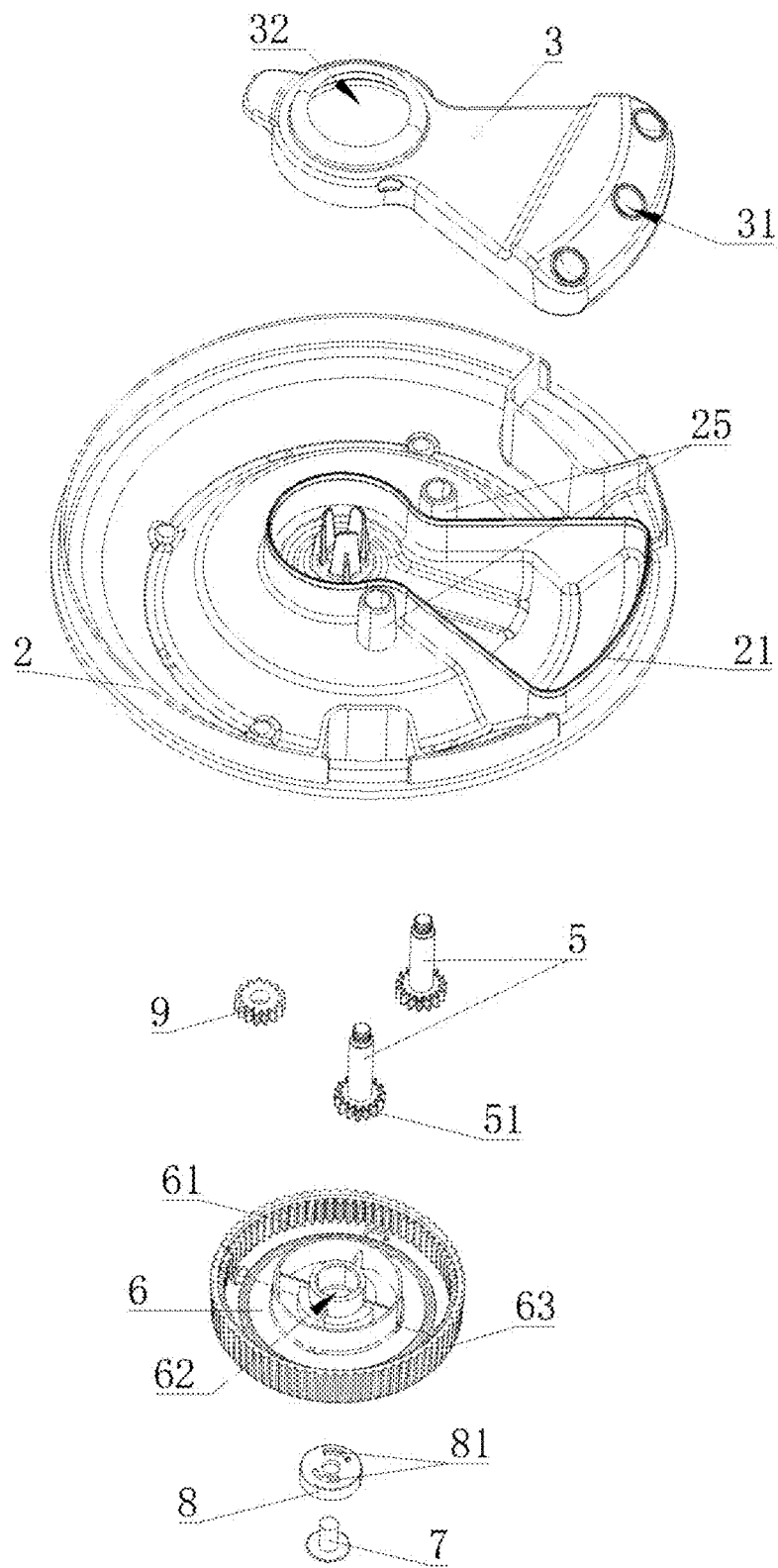
FIG. 3 is a decomposition diagram of the feeding container according to the present invention.
Figure 4:
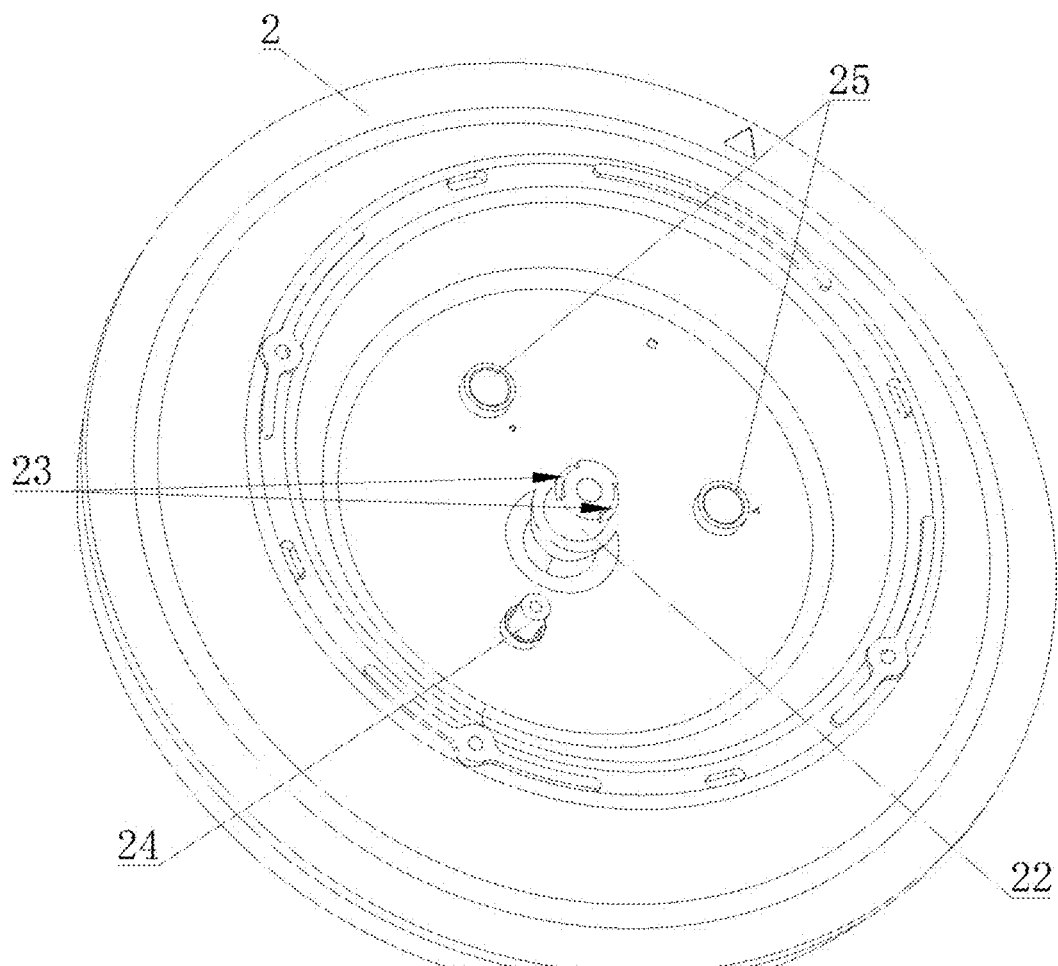
FIG. 4 is a schematic structural diagram of the bottom shell according to the present invention.

As shown in FIGS. 1 to 4, this embodiment provides a hummingbird feeder, which comprises a food storage cylinder 1 and a feeding container, wherein the feeding container comprises a bottom shell 2 and a cover body 3, the bottom shell 2 is detachably connected with the food storage cylinder 1, an annular flange 21 is arranged on the bottom shell 2, the cover body 3 is sealed and buckled on the annular flange 21, and forms a feeding cavity; the cover body 3 is provided with a feeding port 31 and an inlet 32 communicated with the feeding cavity 4, and the inlet 32 is communicated with the food storage cylinder 1.

The feeding container further comprises a connecting piece 5, wherein one end of the connecting piece 5 is in stop fit with the bottom shell 2 and is provided with a gear 51, and the other end of the connecting piece 5 penetrates through the bottom shell 2 and is screwed with the food storage cylinder 1; the bottom of the bottom shell 2 is rotatably connected with a knob 6; the knob 6 is provided with a gear ring 61 meshed with the gear 51, and the gear ring 61 is arranged on an inner circumferential surface of the knob 6; and an anti-slip pattern 63 is provided on an outer peripheral surface of the knob 6. Specifically, the bottom of the food storage cylinder 1 is provided with a threaded hole, the upper end of the connecting piece 5 is provided with an external thread matched with the threaded hole, the bottom shell 2 is convexly provided with a guide sleeve 25, the middle of the connecting piece 5 is sleeved with the guide sleeve 25, and the connecting piece 5 can slide along the guide sleeve 25.

The bottom shell 2 is convexly provided with a main shaft 22, the knob 6 is provided with a rotating hole 62 sleeved with the main shaft 22, the main shaft 22 is connected with a limiting piece 7, and the limiting piece 7 is in stop fit with the bottom surface of the knob 6. A shaft sleeve 8 is sleeved on the limiting piece 7, the shaft sleeve 8 is pressed between the limiting piece 7 and the main shaft 22, a rotation stop block 81 is convexly arranged on the shaft sleeve 8, and a notch 23 for clamping with the rotation stop block 81 is arranged on the main shaft 22. The limiting piece 7 is preferably a screw, the rotating hole 62 is preferably a stepped hole, the area with a larger diameter of the rotating hole 62 can accommodate the shaft sleeve 8 therein, and the limiting piece 7 can be accommodated in the shaft sleeve 8, so that the bottom surface of the knob 6 does not have protrusion, which is more beautiful, and convenient to operate, and does not hinder the operation.

A driven gear 9 meshed with the gear ring 61 is rotatably connected to the bottom of the bottom shell 2, and the driven gear 9 and the connecting piece 5 are evenly distributed along the circumferential direction of the knob 6. The bottom shell 2 is convexly provided with a rotating shaft 24, and the driven gear 9 is sleeved on the rotating shaft 24. Specifically, two connecting pieces 5 are arranged, so that a plurality of connecting positions are arranged between the food storage cylinder 1 and the bottom shell 2, so that the stress is more balanced and the connection is more firm; the two connecting pieces 5 and the driven gear 9 are evenly distributed along the circumferential direction of the knob 6, and an included angle of 120 degrees is formed between the two connecting pieces 5; of course, more connecting pieces 5 can be arranged, so that more connecting positions are formed, and the two connecting pieces 5 are equally distributed along the circumferential direction of the knob 6, so that the stress is more balanced and the connection is more firm. It is worth mentioning that since the gear 51, the driven gear 9 and the ring gear 61 cooperate together to form a planetary gear system, when the knob 6 is rotated, the ring gear 61 rotates, which can drive the gear 51 and the driven gear 9 to rotate at the same time, and then loosen or tighten the connecting piece 5 at the same time.

An annular groove 33 adapted to the annular flange 21 is provided at the bottom of the cover body 3, and the cover body 3 is made of flexible material, preferably silicone. A notch is formed in the cover body 3 to form a feeding port 31, and the food storage cylinder 1 is provided with a feeding nozzle 10 opposite to the feeding port 31. When hummingbirds suck, they can insert their beak into the feeding nozzle 10 and open the feeding port 31 to suck bird food in the feeding cavity 4. The diameter of the inlet 32 is smaller than the diameter of the output port of the food storage cylinder 1. Since the cover body 3 is made of flexible material, the inlet 32 can be tightly and hermetically attached to the outer periphery of the output port of the food storage cylinder 1 after fitting.

The present invention works as follows: when the feeding container needs to be cleaned or replaced, the knob 6 is rotated, and since the gear ring 61 meshes with the gear 51, the gear 51 rotates, that is, the connecting piece 5 rotates in the guide sleeve 25, and because the connecting piece 5 is screwed with the food storage cylinder 1, the connecting piece 5 will be loosened relative to the food storage cylinder 1, and the connecting piece 5 will slide along the guide sleeve 25 until the connecting piece 5 is completely loosened from the food storage cylinder 1, and the feeding container will be separated relative to the food storage cylinder 1, so as to complete the disassembly of the feeding container; The cover body 3 can then be removed from the annular flange 21 for complete cleaning or replacement; conversely, the assembly can be accomplished by reversing operating the above process.

While the basic principles, main features and advantages of the present invention are shown and described above, it should be understood that various other alternatives, modifications and equivalents of the present invention can be made by those persons who are particularly skilled in the art without departing from either the spirit of the present invention or the scope of the appended claims. The scope of protection claimed by the present invention is defined by the appended claims and their effects.

What is claimed is:
1. A hummingbird feeder, comprising
a food storage cylinder (1) and
a feeding container,
wherein: the feeding container comprises a bottom shell (2), a cover body (3) and a connecting piece (5), the bottom shell (2) is detachably connected with the food storage cylinder (1), and an annular flange (21) is arranged on the bottom shell (2);

the cover body (3) is sealed and buckled on the annular flange (21) and forms a feeding cavity (4); the cover body (3) is provided with a feeding port (31) and an inlet (32) that are connected with the feeding cavity (4), and the inlet (32) is connected with the food storage cylinder (1);

one end of the connecting piece (5) is in stop fit with the bottom shell (2) and is provided with a gear (51), and an other end of the connecting piece (5) passes through the bottom shell (2) and is screwed with the food storage cylinder (1); a bottom of the bottom shell (2) is rotatably connected with a knob (6), and the knob (6) is provided with a gear ring (61) meshed with the gear (51).

2. The hummingbird feeder according to claim 1, wherein the bottom shell (2) is convexly provided with a main shaft (22), the knob (6) is provided with a rotating hole (62) sleeved with the main shaft (22), the main shaft (22) is connected with a limiting piece (7), and the limiting piece (7) is in stop fit with a bottom surface of the knob (6).

3. The hummingbird feeder according to claim 2, wherein a shaft sleeve (8) is sleeved on the limiting piece (7), the shaft sleeve (8) is pressed between the limiting piece (7) and the main shaft (22), a rotation stop block (81) is convexly arranged on the shaft sleeve (8), and a notch (23) for clamping with the rotation stop block (81) is arranged on the main shaft (22).

4. The hummingbird feeder according to claim 1, wherein a driven gear (9) meshed with the gear ring (61) is rotatably connected to the bottom of the bottom shell (2), and the driven gear (9) and the connecting piece (5) are evenly distributed along a circumferential direction of the knob (6).

5. The hummingbird feeder according to claim 4, wherein the bottom shell (2) is convexly provided with a rotating shaft (24), and the driven gear (9) is sleeved on the rotating shaft (24).

6. The hummingbird feeder according to claim 1, wherein the gear ring (61) is provided on an inner circumferential surface of the knob (6), and an anti-slip pattern (63) is provided on an outer peripheral surface of the knob (6).

7. The hummingbird feeder according to claim 1, wherein an annular groove (33) adapted to the annular flange (21) is provided at a bottom of the cover body (3).

8. The hummingbird feeder according to claim 1, wherein the cover body (3) is made of flexible material.

* * * * *